United States Patent
Baldus et al.

(10) Patent No.: US 9,791,662 B2
(45) Date of Patent: Oct. 17, 2017

(54) LIGHTWEIGHT CARRIER STRUCTURE, PARTICULARLY FOR OPTICAL COMPONENTS, AND METHOD FOR ITS PRODUCTION

(71) Applicant: Berliner Glas KGaA Herbert Kubatz GmbH & Co., Berlin (DE)

(72) Inventors: Oliver Baldus, Berlin (DE); Volker Schmidt, Berlin (DE)

(73) Assignee: Berliner Glas KGaA Herbert Kubatz GmbH & Co., Berlin (DE)

( * ) Notice: Subject to any disclaimer, the term of this patent is extended or adjusted under 35 U.S.C. 154(b) by 0 days.

(21) Appl. No.: 14/511,773

(22) Filed: Oct. 10, 2014

(65) Prior Publication Data

US 2015/0028176 A1    Jan. 29, 2015

Related U.S. Application Data

(62) Division of application No. 12/717,612, filed on Mar. 4, 2010, now abandoned.

(30) Foreign Application Priority Data

Mar. 5, 2009 (DE) .................. 10 2009 011 863

(51) Int. Cl.
  *G02B 7/183* (2006.01)
  *G02B 7/182* (2006.01)
  (Continued)

(52) U.S. Cl.
  CPC ............ *G02B 7/182* (2013.01); *C04B 37/042* (2013.01); *C04B 37/045* (2013.01); *F16M 13/00* (2013.01);
  (Continued)

(58) Field of Classification Search
  CPC .................................. G02B 7/182; G02B 7/183
  (Continued)

(56) References Cited

U.S. PATENT DOCUMENTS 2,988,959 A   6/1961   Pelkey at al.
3,272,686 A   9/1966   Smith et al.
(Continued)

FOREIGN PATENT DOCUMENTS

DE   3018785 A1      11/1981
DE   19730741 C1     11/1998
DE   202005020998 U1  2/2007

OTHER PUBLICATIONS

Zhang et al ,"Large-scale fabrication of lightweight Si/SIC ceramic composite optical mirror", Materials Letters 58 (2004) 1204-1208.*
(Continued)

*Primary Examiner* — Ricky D Shafer
(74) *Attorney, Agent, or Firm* — Ceasar Rivise, PC

(57) ABSTRACT

A carrier structure (100), particularly for optical components, includes a carrier body (10) which is formed from ceramic with hollows (11), and at least one cover layer (21, 22) which is formed from glass, arranged on at least one surface of the carrier body (10), and is connected to the carrier body (10) by means of at least one bond connection (23, 24) produced by means of anodic bonding. Methods for producing the carrier structure (100) and the use of the carrier structure as a mirror body, carrier for optical components and/or mechanical carrier for dynamically moved components are also described.

16 Claims, 4 Drawing Sheets

(51) Int. Cl.
 *C04B 37/04* (2006.01)
 *F16M 13/00* (2006.01)
(52) U.S. Cl.
 CPC .......... *G02B 7/183* (2013.01); *C04B 2237/10* (2013.01); *C04B 2237/12* (2013.01); *C04B 2237/365* (2013.01); *F16M 2200/08* (2013.01)
(58) Field of Classification Search
 USPC .... 359/848, 871, 900; 428/72, 73, 116, 119, 428/172; 156/89.22
 See application file for complete search history.

(56) References Cited

U.S. PATENT DOCUMENTS

| | | |
|---|---|---|
| 3,453,041 A | 7/1969 | Rantsch |
| 3,484,327 A | 12/1969 | Denman |
| 3,484,328 A | 12/1969 | Austin et al. |
| 3,514,275 A | 5/1970 | Bray |
| 3,600,257 A | 8/1971 | Reinhardt |
| 3,644,022 A | 2/1972 | Jagdt et al. |
| 3,754,812 A | 8/1973 | Mohn |
| 3,856,384 A | 12/1974 | Kryzhanovsky |
| 4,408,833 A | 10/1983 | Gowan |
| 4,435,045 A | 3/1984 | Fried |
| 4,447,130 A | 5/1984 | Christiansen et al. |
| 4,466,700 A | 8/1984 | Christiansen et al. |
| 4,481,497 A | 11/1984 | Kurtz et al. |
| 4,614,119 A | 9/1986 | Zavracky et al. |
| 4,686,684 A * | 8/1987 | Dalton et al. .................. 372/99 |
| 5,071,596 A | 12/1991 | Goela et al. |
| 5,076,700 A | 12/1991 | DeCaprio |
| 5,227,921 A | 7/1993 | Bleier et al. |
| 5,741,445 A | 4/1998 | Taylor et al. |
| 5,825,565 A | 10/1998 | Papenburg et al. |
| 6,176,588 B1 | 1/2001 | Davis, Jr. et al. |
| 6,338,284 B1 | 1/2002 | Najafi et al. |
| 6,426,968 B1 | 7/2002 | Strife et al. |
| 6,598,984 B2 | 7/2003 | Rietz et al. |
| 6,759,309 B2 | 7/2004 | Gross |
| 7,195,361 B2 * | 3/2007 | Ealey ............................ 359/849 |
| 7,348,535 B2 | 3/2008 | Jeong et al. |
| 7,429,114 B2 | 9/2008 | Desmitt et al. |
| 2004/0012767 A1 | 1/2004 | Van Elp et al. |
| 2005/0132750 A1 | 6/2005 | Elp |
| 2008/0117489 A1 | 5/2008 | Tanaka et al. |
| 2010/0047588 A1 | 2/2010 | Hata et al. |

OTHER PUBLICATIONS

Ealey, Mark A., and John A. Wellman. "Ultralightweight silicon carbide mirror design." SPIE's 1996 International Symposium on Optical Science, Engineering, and Instrumentation. International Society for Optics and Photonics, SPIE, vol. 2856, 1996, pp. 73-77.*

Ealey, Mark A., and Gerald Q. Weaver. "Developmental history and trends for reaction-bonded silicon carbide mirrors." SPIE's 1996 International Symposium on Optical Science, Engineering, and Instrumentation. International Society for Optics and Photonics,, SPIE, vol. 2857, 1996, pp. 66-72.*

Zhang, Yumin, et al. "Si/SiC Ceramic Composite for Space Optical Mirror." 56 th International Astronautical Congress. 2005.*

* cited by examiner

LIGHTWEIGHT CARRIER STRUCTURE, PARTICULARLY FOR OPTICAL COMPONENTS, AND METHOD FOR ITS PRODUCTION

BACKGROUND

The invention relates to a carrier structure, particularly for optical components, comprising a carrier body with hollows (hollow spaces) and at least one cover layer which is arranged on at least one surface of the carrier body. The invention relates in particular to a lightweight carrier structure for an optical mirror or for a dynamically movable carrier platform, e.g. for optical components. The invention also relates to a method for producing a carrier structure of this type. Applications of the invention exist in particular in the case of the production of optical components or carriers for optical components.

A lightweight carrier structure is a mechanical component, the mass of which is minimized by means of the formation of hollows in a carrier body of the carrier structure. A hollow honeycomb structure, which is characterized by a high mechanical stability, can be formed for example in the carrier body. Applications of lightweight carrier structures exist for example in optics and precision engineering, if components should be as light as possible, e.g. for transport purposes or for a fast dynamic response behavior. In addition to the minimal mass, further requirements can exist in relation to the mechanical stability (in particular strength and rigidity), the thermal stability (in particular geometric stability in the case of temperature changes) and the resistance against external influences, such as e.g. chemicals or highly energetic radiation. Furthermore, there exists an interest in a high long-term stability, i.e. insomuch as it is possible, the mechanical and thermal properties should not change during the lifetime of the carrier structure.

It is known from practice to produce a lightweight carrier structure with a milled out carrier body, wherein the hollows in the carrier body are open on one side. It can be advantageous that a plurality of materials for carrier structures of this type are suitable and the carrier structure can be produced in a simple manner. Disadvantages exist, however, with reference to differences of mechanical or thermal properties which can occur on different sides of carrier bodies of this type due to the absence of symmetry. Therefore, carrier bodies with closed hollows, in which the hollows are enclosed on all sides by the material of the carrier body, are preferred for precision applications.

Carrier bodies with closed hollows place particular requirements on the production method. For example, closed hollow structures can be produced from beryllium, wherein considerable difficulties result from the toxicity of the material, however. Ceramic carrier bodies with hollows are also known from practice, which ceramic bodies are formed in a precursor state of the ceramic and are filled with a filler. The filler is removed after the sintering of the ceramic. This technology has disadvantages in relation to the complexity of conducting the method and limitations with reference to the geometry of the hollows that can be set.

Furthermore, it is known from practice to provide carrier bodies with hollow spaces with cover layers on one or both sides in order to close the hollows. The connection between the cover layer, which e.g. consists of glass, and the carrier body, e.g. made from ceramic, has hitherto been produced e.g. with a glass solder or an adhesive. Such connection types have proven insufficiently stable in the case of numerous applications.

Particularly high stability requirements exist on carrier structures for optical applications, such as e.g. for mirrors, which are used in optical communication between satellites or in optical telescopes. So, mirror bodies for satellite communication (CPA, "Course pointing assembly" systems) for transporting into space and operation on satellites must have a mass which is a small as possible, a high rigidity and dimensional precision because of the high accelerations and a high thermal stability because of the extreme temperature differences on the light and dark side of up to 200° C. Mirror bodies for CPA systems have hitherto been produced e.g. from beryllium, which has the above-mentioned disadvantages, however.

It is the objective of the invention to provide an improved carrier structure, particularly for optical components, with which carrier structure the disadvantages of conventional lightweight carrier structures are overcome. The carrier structure should in particular be characterized by a high mechanical stability, thermal stability and/or long-term stability and be producible in a simple manner. The carrier structure should furthermore be characterized by an improved rigidity and dimensional precision, stability with respect to temperature fluctuations, variability in the case of the selection of a hollow geometry and/or resistance to chemical influences or radiation influences. Furthermore, it is the objective of the invention to provide an improved method for producing a carrier structure, with which disadvantages of conventional methods for providing lightweight carrier structures are overcome.

These objectives are achieved by means of a carrier structure or a method for its production according to the invention.

SUMMARY OF THE INVENTION

According to a first aspect of the invention, a carrier structure, particularly for optical components, is provided, which is composed of a ceramic carrier body and at least one glass cover layer, wherein the at least one cover layer is connected to the carrier body by means of anodic bonding. The carrier body has hollows so that the mass density of the carrier body is smaller than the mass density of solid ceramic, from which the carrier body is formed. The carrier structure is therefore also designated as a lightweight carrier structure. Between the glass material of the at least one cover layer and the ceramic material of the carrier body, there is a bond connection due to material engagement formed (firmly bonded) by anodic bonding (anodic bond connection). The term "anodic bond connection" relates generally to a two-dimensional connection of touching surfaces of solid components, particularly for connecting the glass cover layer to the ceramic carrier body or carrier body parts, wherein the connection is formed by means of a chemical bonding between the atoms of the touching components. The anodic bond connection is characterized by means of an ion concentration gradient across the interface of the parts connected to one another. The ion concentration gradient is formed by means of the space-charge regions arising due to anodic bonding.

According to a second aspect of the invention, a method for producing a carrier structure is provided, in which a cover layer made from glass is connected by means of anodic bonding to at least one surface of a carrier body made from a ceramic and having hollows.

The inventors have found that the following advantages are achieved with the application of the anodic bonding for producing a carrier structure. First, the bond connection constitutes a firm bond between the carrier body and the cover layer, which firm bond is free from foreign material, such as e.g. glass solder or adhesive. The bond connection provides a high strength, with which the rigidity of the carrier structure is improved. The bond connection consists completely of inorganic materials, particularly materials which are extremely stable chemically. Advantageously, a degrading of the connection by means of outgassing, as can occur in the case of conventional adhesively bonded carrier structures, is excluded. Furthermore, the bond connection is resistant to highly energetic radiation, particularly to cosmic radiation or γ radiation. Therefore the long-term stability of the carrier structure is increased, which is of particular advantage for optical components for application in space, such as e.g. for mirrors for satellite communication.

The use according to the invention of anodic bonding for firmly bonding of the at least one cover layer to the carrier body further offers advantages for the optical properties of the carrier structure. On the one hand, the carrier body has the desired strength and stability as well as a high potential for weight reduction by means of a high aspect ratio (volume of the hollows:volume of the carrier body material), wherein however, the hardness and microscopic roughness of the ceramic carrier body makes processing difficult, particularly for forming optically reflective surfaces. On the other hand, the glass cover layer makes good processing, particularly shaping and surface finishing (particularly polishing), possible. Thus, the carrier structure according to the invention combines a high mechanical stability, particularly rigidity and strength, with the suitability for providing exceptional optical properties. It is advantageous in particular that the carrier body can be machined with a relatively small precision, whilst the setting of the shape and surface finish with the processing of the cover layer with utmost precision is enabled.

A plurality of ceramic materials for producing the carrier body of the carrier structure according to the invention is advantageously available. Preferably, the carrier body is formed from an electrically conductive ceramic or from a composite based on e.g. SiC, SiN, TiN, $SiO_2$, MgO and/or $Al_2O_3$. Electrically conductive ceramics have the particular advantage that no additional surface treatments of the ceramic are required for forming the bond connection. A ceramic based on SiC has proven advantageous in particular as an electrically conductive ceramic. So, C—SiC ceramic (or: CSiC ceramic) has C fibers which act in a strengthening manner. Furthermore, the CSiC ceramic is porous which contributes to weight reduction. The carrier structure is particularly preferably produced from Si—SiC ceramic (or: SiSiC ceramic). SiSiC ceramic has particular advantages with reference to a high heat conduction and a high thermal stability in the case of simultaneously high rigidity and dimensional precision.

The term "carrier body" designates each mechanically solid component which has a shape suitable for the carrier structure. Preferably, the carrier body has the shape of a plate. The sides extending in a lateral direction of the plate are designated as main surfaces of the carrier body, whilst the sides extending in a transverse or thickness direction of the plate are designated as side surfaces. The carrier body can have at least one planar and/or at least one curved surface. The plate of the carrier body can be planar or curved, e.g. spherically or aspherically curved. The carrier body can consist in one piece of a single ceramic. Alternatively, the carrier body can be assembled from multiple parts made from a single ceramic or from various ceramics. The at least one cover layer can be arranged on at least one of the main surfaces and/or side surfaces of the carrier body.

According to a preferred embodiment of the invention the carrier body comprises a plurality of layered carrier body parts. The carrier body parts form a stack or layer composite. Preferably, the carrier body parts are connected to one another by means of anodic bonding using a glass intermediate layer as it is known in the art. The carrier body parts can in each case have closed hollows or form the hollows of the carrier body together in the composite. The carrier body made from a plurality of carrier body parts has the advantage that the setting of the thickness and the shape of the carrier structure is simplified.

According to a particularly preferred embodiment of the invention, the carrier body parts form a closed hollow structure in the composite of the carrier body. The main surfaces of the carrier body are formed by means of continuous closed sides of the carrier body parts. Recesses in the volume of the carrier body parts, which are generated by means of mechanical processing for production of the hollows, face one another in the assembled carrier body. Walls or webs between the hollows of the carrier body parts are connected to one another in the carrier body and mutually support one another. The formation of the closed hollow structure has the particular advantage that closed surfaces are provided for fixing the cover layer.

The term "cover layer" designates at least one glass layer which is arranged on at least one surface of the carrier body. Preferably at least two glass layers are provided, which are fixed on mutually opposite main surfaces of the carrier body by means of anodic bonding. The at least one glass layer of the cover layer consists e.g. of Na-containing glass (particularly borosilicate glass, e.g. Borofloat 33 (reg. trade mark), 7070 Glass (Schott) or SW Glass (Asahi)). The glass layers can consist of different glass materials or preferably of identical glass material on both sides. The thickness of the cover layer is preferably at least 10 μm, e.g. at least 50 μm, wherein it is preferably less than 5 mm, particularly smaller than or equal to 1 μm.

According to a further particularly preferred embodiment of the invention, the carrier body and the cover layers form a layer construction with thermal dimensional stability (temperature-independent shape, thermally compensated shape). The carrier body and the cover layers are selected in such a manner with reference to the materials and geometric properties (shape, size), that the shape of the carrier structure remains unchanged in the case of a temperature change. A symmetrical construction made up of identical materials, shapes and sizes of the carrier body and the glass layers is preferably provided on both sides in relation to the stress-neutral plane which is in the thickness direction, particularly in the centre of the carrier structure. Preferably, the effect of different thermal coefficients of expansion of the carrier body and the cover layers is compensated with the symmetrical construction. Preferably, the carrier body parts arranged on both sides of the neutral axis have the same thickness. Particularly preferably, the glass layers arranged on the surfaces of the carrier body also have the same thickness.

According to a further variant of the invention, it can be provided that the carrier body and/or the at least one cover layer has pressure balance openings. The hollows in the carrier body are connected to one another and/or to surroundings of the carrier structure via the pressure balance openings. Advantageously, a deformation of the carrier structure under changing temperature and pressure conditions is thus prevented.

Advantageously, the carrier structure according to the invention offers numerous applications, particularly in optics and mechanical engineering. Particularly preferably, the carrier structure forms a mirror body (mirror block). Preferably, in this case a reflector layer is arranged on at least one surface, particularly preferably on both main surfaces of the carrier structure. The reflector layer consists, e.g. of a metal or a metal alloy or one or a plurality of dielectric layers. The carrier structure with the at least one reflector layer can e.g. form a mirror for communication applications, particularly in CPA systems, a telescope mirror or a movable mirror for beam deflection (scan mirror) in a scanning microscope or a display device. Alternatively, the carrier structure can form a platform for optical components, particularly in data communication or optical measurement technology. In this case, the carrier structure and/or the cover layer is preferably equipped with holding elements for fixing optical components, such as e.g. for fixing mirrors, prisms, lenses, optical fibers, beam splitters or the like. Advantageously, there are also non-optical applications of the carrier structure, however. The carrier structure can generally be used for platforms for dynamically moved components, such as e.g. positioning stages with optical components.

A further advantage of the carrier structure consists in the large selection of realizable dimensions. So, the surface of the carrier structure can have a typical extent of at least 1 mm, particularly at least 1 cm, preferably at least 20 cm, e.g. at least 40 cm or larger. Typically, the lateral extent of the surface is smaller than 100 cm, e.g. smaller than 50 cm. The thickness of the carrier body can be at least 1 mm, e.g. at least 5 mm, such as e.g. 1 cm or more. Typically, the thickness of the carrier body is less than 20 cm, preferably less than 10 cm, e.g. 5 cm or less.

The use of glass for forming the cover layer enables minimized surface roughnesses which are smaller than 1 µm, preferably smaller than 100 nm, particularly preferably smaller than 5 nm, e.g. 2 nm or less. Roughnesses smaller than 4 nm, even down to 1 nm or less can be realized in particular, which is advantageous e.g. for applications in CPA systems or telescopes. It would not be possible to achieve such a small surface roughness by means of polishing of the surface of crystalline or multi-phase ceramic.

The carrier body has hollows which are preferably formed by recesses in the material of the carrier body and/or by means of a porous structure of the carrier body. Advantageously, there are various variants for forming the hollows in the carrier body. Preferably, shaping takes place in a precursor state of the ceramic, in which the ceramic is not yet completely processed, particularly not yet hardened (so-called green-machining of the ceramic). For example, the structure is milled in SiSiC ceramic before the SiSiC ceramic is fired, sintered and infiltrated with Si. The formation of the hollows, e.g. with milling tools, is advantageously particularly simple in this precursor state. Possible deformations of the carrier body after the finishing of the ceramic, particularly after the firing and sintering, can be compensated by means of post-processing and/or the shaping of the at least one cover layer. Alternatively, the formation of the hollows can take place by means of a mechanical processing on the finished bulk material of the ceramic of the carrier body. The mechanical processing can comprise a milling, an erosion (spark erosion), sandblasting and/or water/sandblasting.

The production of a thermally-compensated carrier structure preferably takes place with the following steps. Initially, first and second plate-shaped carrier body parts are prepared with hollows that are open on one side. The hollows are formed identically so that front sides of the walls between the hollows form identical geometric arrangements. In the assembled state of the carrier body parts, the latter are connected to one another at the front sides of the wall material between the hollows by means of anodic bonding, e.g. using a glass intermediate layer, or by means of high-temperature soldering. The first and second carrier body parts have closed main surfaces on the sides facing away from the hollows, onto which main surfaces first and second glass layers are applied by means of anodic bonding in each case. Alternatively, two components can initially be produced, which in each case consist of a carrier body part and a glass layer. In a second step, the first and second carrier body parts can then be connected to one another by means of anodic bonding on the open sides which are provided with hollows. Finally, a post processing of the glass layers in order to provide identical layer thicknesses or a polished surface, and/or the introduction of pressure balance openings, e.g. by means of drilling, optionally takes place. The pressure balance openings are preferably opened facing towards the lateral side of the carrier structure.

BRIEF DESCRIPTION OF THE DRAWINGS

Further details and advantages of the invention are described in the following with reference to the attached drawings. In the figures.

DETAILED DESCRIPTION OF PREFERRED EMBODIMENTS

Figure 1:
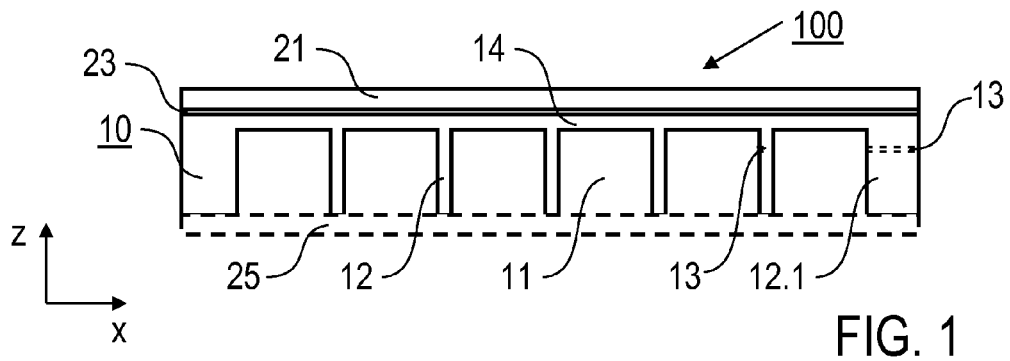
FIGS. 1 to 3: show schematic sectional views of preferred embodiments of carrier structures according to the invention.
Figure 2:
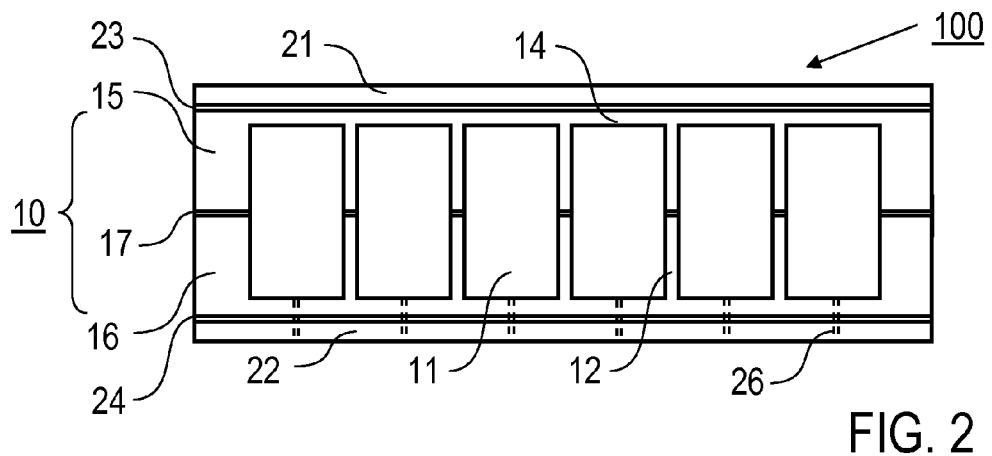
Figure 3:
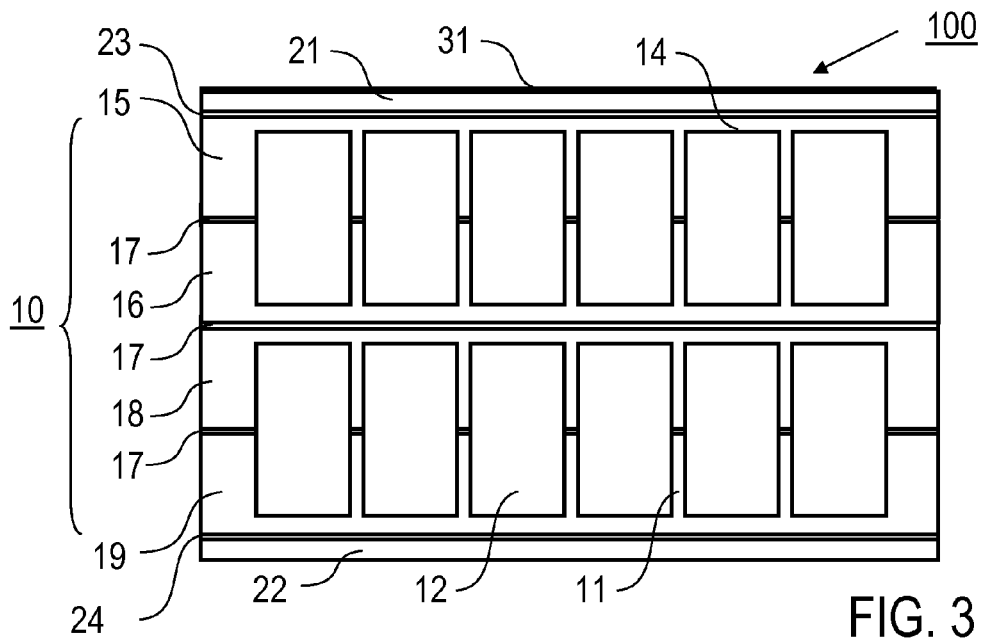

FIGS. 1 to 3 illustrate embodiments of the carrier structure 100 according to the invention in a schematic sectional view which is not to scale. The carrier structure 100 comprises a carrier body 10 and at least one cover layer 21, 22 which is connected to surfaces of the carrier body 10 on one or both sides by means of at least one bond connection 23, 24.

The carrier body 10 consists of an electrically conductive ceramic, e.g. SiSiC ceramic, in which hollows 11 are formed. For applications of the carrier structure as a mirror block, e.g. in a CPA system or a telescope, the thickness of the carrier body 10 is preferably selected in the range from 1 cm to 10 cm. The hollows 11 extend in the thickness direction (z direction) through the carrier body 10 in such a manner that a side wall 14 closed in the lateral direction (x direction) remains closed on one side of the carrier body 10. The side walls 14 form the main surfaces of the carrier body 10. All hollows 11 can have the same form or be formed along the lateral extent of the carrier body 10 with various sizes and/or shapes.

The hollows 11 are separated from one another by means of intermediate walls 12 and outwardly closed by means of side walls 12.1. At least one pressure balance opening 13 (shown dotted) can optionally be provided in at least one intermediate wall 12 and/or side wall 12.1, which pressure balance opening is provided for a pressure balance between adjacent hollows 11 and/or with the surroundings of the carrier structure 100. The pressure balance opening can have a diameter which is less than 1 mm, particularly less than 100 μm.

The intermediate walls 12 can all have the same thickness or various thicknesses. Typically, the thickness of the intermediate walls 12 is less than 1 cm, e.g. less than 5 mm or 2 mm. The thickness of the intermediate walls 12 is at least 0.5 mm, e.g. at least 1 mm. The lower limit of the thickness of the intermediate walls 12 is dependent on the ceramic material used. The minimum thickness should correspond to 2 to 3 times the grain size of the ceramic and thus typically be at least 60 μm. For reasons of stability, the side walls 12.1 provided at the sides of the carrier body have a larger thickness than the intermediate walls 12 provided in the interior of the carrier body 10. The intermediate walls 12 extend across the entire thickness of the carrier body 10. In the case of a planar carrier body 10, all of the intermediate walls 12 have the same height. In the case of a curved carrier body 10, the intermediate walls 12 have various heights following the curvature of the carrier body 10.

The shape and size of the hollows 11 and the intermediate walls 12 can in particular be freely selected depending on the application of the carrier structure 100. The hollows 11 can e.g. form a honeycomb structure or box structure or have the shape of cones or semi-spheres.

The at least one cover layer 21, 22 consists of a glass, e.g. Borofloat (reg. trade mark). The cover layer 21 has a thickness of 50 μm. At least one of the cover layers 21, 22 has a polished surface with a roughness, which is e.g. 2 nm or 1 nm. The at least one bond connection 23, 24 between the at least one cover layer 21, 22 and the adjacent surface of the carrier body 10 contains an ion concentration gradient transversely to the interface between the parts connected to one another.

According to FIG. 1, the carrier structure 100 consists of one single carrier body part which can be open on one side or optionally (as shown dashed) closed with an additional layer 25. The additional layer 25 can likewise be connected to the carrier body 10 by means of anodic bonding or by means of other connection methods, e.g. thermal bonding, depending on the application of the carrier structure 100. The variant according to FIG. 1 advantageously has a simple construction. It is preferably used when there are low requirements with reference to the thermal stability.

According to FIG. 2, the carrier body 10 consists of two carrier body parts 15, 16, which in each case have hollows 11 and intermediate walls 12. The carrier body parts 15, 16 are connected to one another by means of anodic bonding using a glass intermediate layer 17 (the bond connection layers are not shown). Preferably, the carrier body parts form a closed hollow structure, in that the connection of the carrier body parts 15, 16 takes place at their open sides. The carrier body parts 15, 16 are connected to one another via front sides of the intermediate walls 12. To this end, a mutual orientation can be provided during anodic bonding when using e.g. optical markings. The mutual orientation can be simplified in that the intermediate walls 12 of the carrier body parts 15, 16 are formed with various thicknesses. Pressure balance openings 26 can be provided (illustrated dotted, see FIG. 4) in the carrier body part 16 and e.g. in the lower cover layer 22. The pressure balance openings 13 illustrated in FIG. 1 can also optionally be provided.

FIG. 3 illustrates a further variant of a carrier structure 100, the carrier body 10 of which comprises a composite of a plurality of carrier body parts 15, 16, 18, 19. The carrier body parts are connected to one another by means of anodic bonding by means of glass intermediate layers 17. The cover layers 21, 22 are likewise fixed by means of anodic bonding on the outer surfaces of the carrier body 10.

FIG. 3 furthermore illustrates the provision of a reflector layer 31 on the cover layer 21 by way of example. The reflector layer 31 consists e.g. of molybdenum, in particular with a thickness of a few nm. In the case of modified variants of the invention, particularly also in the case of the embodiments shown in FIGS. 1 and 2, the reflector layer can be provided on both sides of the carrier structure 100. The carrier structure provided with at least one reflector layer forms a mirror according to the invention, which is provided in particular for application in a CPA system, a telescope or a scanning mechanism.

The variants of FIGS. 2 and 3 are suitable in particular for producing a layer construction with thermal dimensional stability. A symmetrical construction made up of identical materials, shapes and sizes of the carrier body and the glass layers is preferably provided to this end on both sides perpendicularly to the thickness direction in relation to the central plane.

Figure 4:
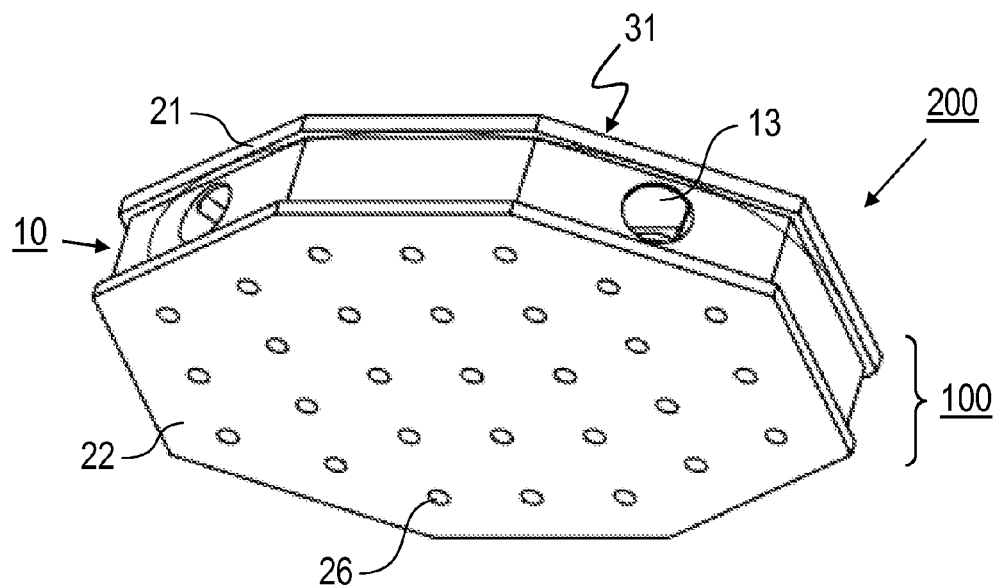
FIG. 4: shows a schematic perspective view of a mirror produced with a carrier structure according to the invention.

FIG. 4 illustrates a mirror 200 comprising a carrier structure 100 and a reflector layer 31 in a perspective view. The carrier structure 100 comprises a carrier body 10 with lateral pressure balance openings 13, on the surfaces of which cover layers 21, 22 are fixed by means of anodic bonding. Further pressure balance openings 26 (see FIG. 2) are provided on the non-reflecting side in the cover layer 22 (in FIG. 4: lower side). The reflector layer 31 is provided on the opposing side of the mirror 200 (in FIG. 4: upper side).

Figure 5:
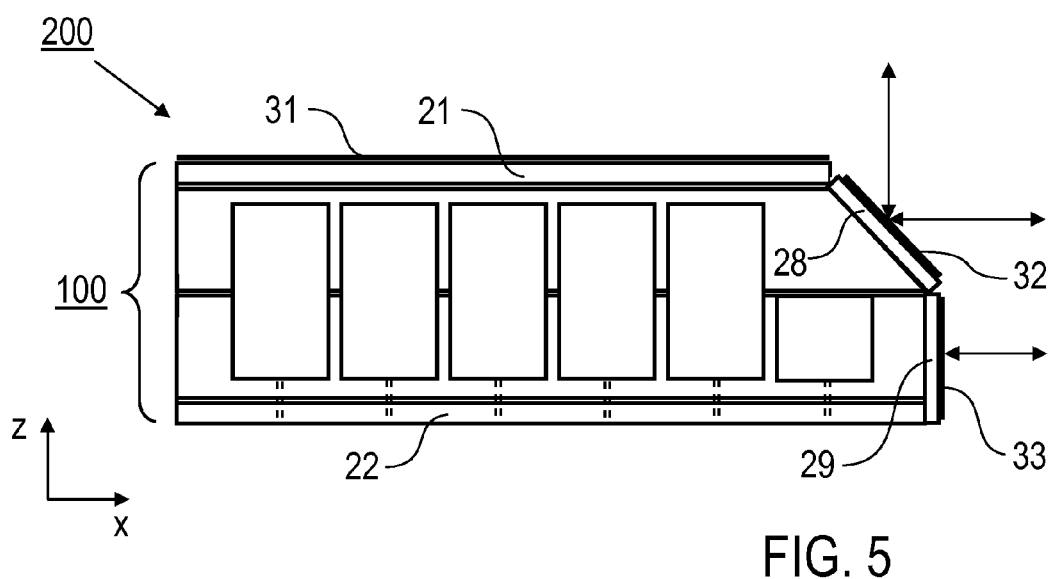
FIG. 5: shows a schematic sectional view of a further mirror produced with a carrier structure according to the invention.

The carrier body parts, the composite of which forms the carrier body 10, can be shaped identically or differently. For example, at least one carrier body part can be formed with at least one slanted side wall. So, by way of example and in a schematic sectional view, FIG. 5 illustrates a mirror 200 comprising a carrier structure 100 and three reflector layers 31, 32, 33 which are arranged on glass cover layers 21, 28 and 29 on the upper main surface, an obliquely running side surface and a perpendicular side surface of the carrier body 10. This mirror with a diameter of e.g. 20 cm is suitable in particular for a combined distance and height measurement in the x and z directions.

Figure 6:
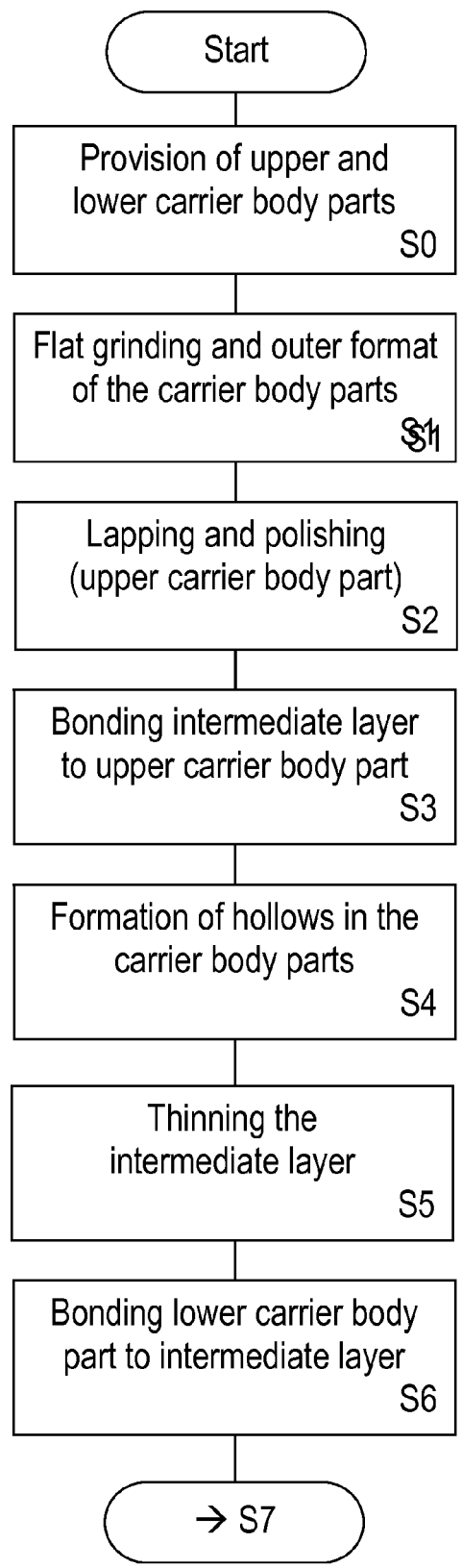
FIGS. 6 and 7: show method steps of the production of a carrier structure according to the invention.
Figure 6:
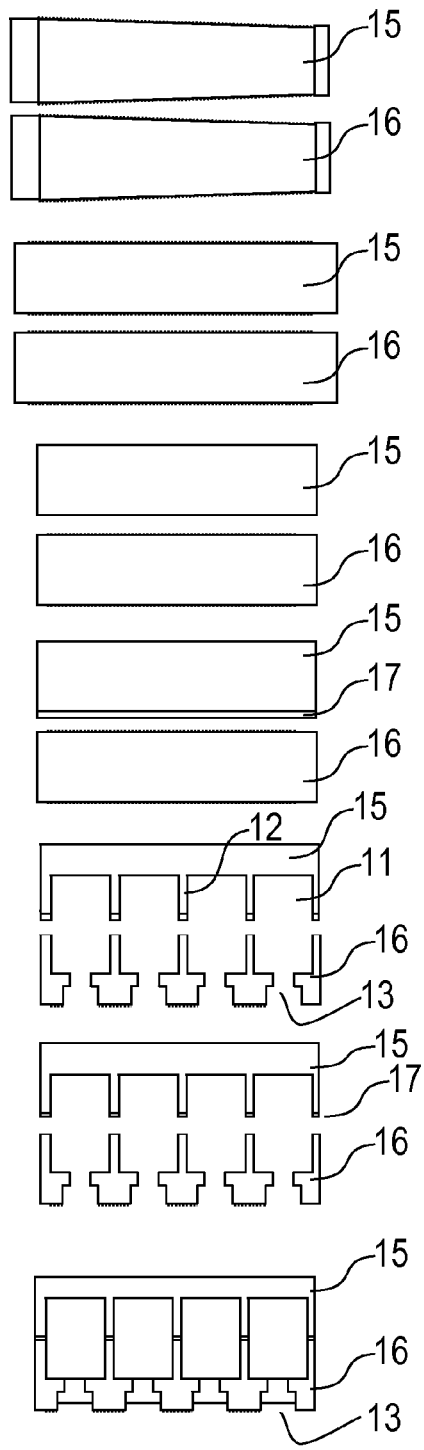
Figure 7:
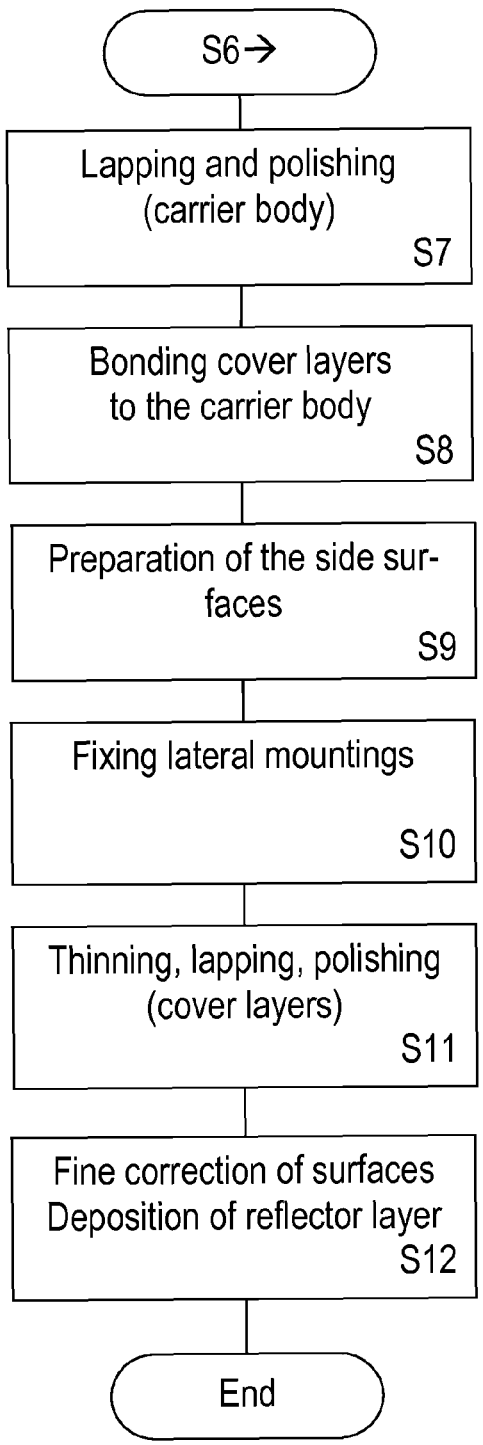
Figure 7:
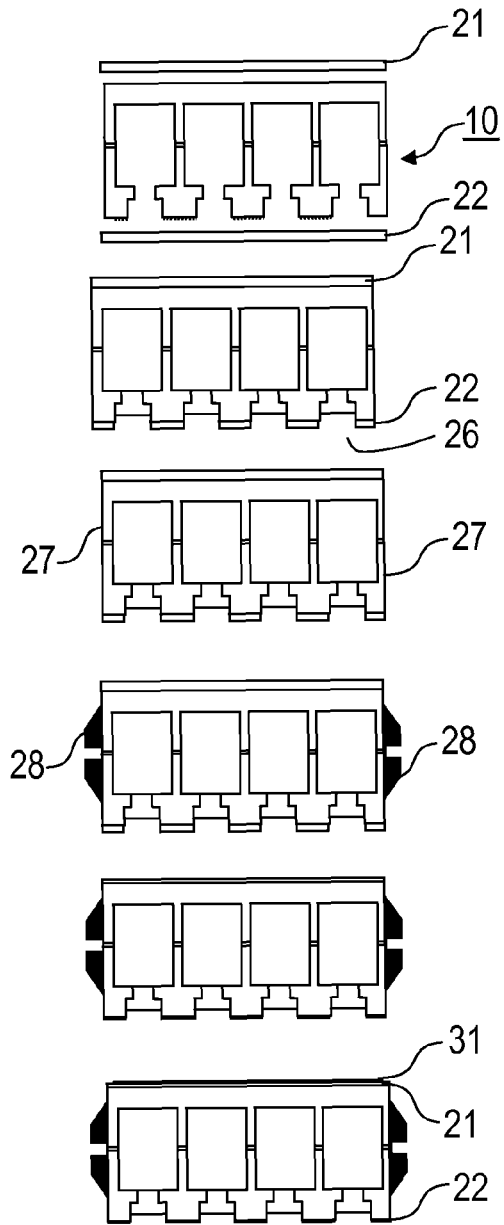

Details of a preferred embodiment of the method according to the invention for producing a carrier structure 100 are illustrated in FIG. 6 (formation of the carrier body 10) and FIG. 7 (connection of the carrier body 10 to the cover layers 21, 22).

In Step S0, two raw unprocessed carrier body parts 15, 16 are provided, which comprise e.g. two SiSiC discs with a diameter of 31 mm and a thickness of 7 mm. Then in Step S1, a flat grinding of the carrier body parts 15, 16 and the setting of their outer format with lateral dimensions of e.g. 220 mm·150 mm are conducted. In Step S2, lapping and polishing of at least one of the carrier body parts (e.g. 15) takes place for preparing the inner bond connection between the carrier body parts 15, 16.

The anodic bonding of the carrier body parts 15, 16 takes place in two substeps with the use of a glass intermediate layer 17, which is initially connected to the carrier body part 15 by means of anodic bonding in Step S3 and is connected to the carrier body part 16 in Step S6 (see below). The anodic bonding takes place using a glass intermediate layer. Alternatively to the anodic bonding, the carrier body parts can be connected by means of high-temperature soldering.

Subsequently, in Step S4, the hollows 11 are formed in the carrier body part 15/glass intermediate layer 17 composite and in the carrier body part 16. The shaping of the hollows 11 takes place e.g. with an ultrasound CNC method. This has the advantage that particularly small forces are exerted for shaping, which enables the formation of filigree structures, particularly minimal thickness of the intermediate walls 12 (see e.g. FIG. 2). Alternatively, the formation of the hollows 11 can take place by means of spark erosion. Furthermore, in Step S4 the pressure balance openings 13 are provided in the lower carrier body part 16 e.g. by means of spark erosion (EDM).

In a further Step S5, a thinning of the glass intermediate layer 17 on the upper carrier body part 15 and its surface treatment by means of lapping and polishing takes place. Furthermore, the lower carrier body part 16 is subjected to a surface treatment by means of lapping and polishing for preparing the bond connection to the cover layer 22 (see below). Finally, in Step S6, the connection of the lower and upper carrier body parts 15, 16 takes place by means of anodic bonding. The pressure balance openings 13 are initially closed in order to form a substrate for the subsequent steps for applying the cover layers (see FIG. 7). As a result, in Step S6, the carrier body 10 with the closed hollow structure is provided.

The connection of the cover layers 21, 22 to the carrier body 10 and the application of a reflector layer 31 is illustrated with the further steps S7 to S12 in FIG. 7. Initially, in Step S7, a lapping and polishing of the outer surface of the carrier body 10 takes place for preparing the anodic bonding of the cover layers 21, 22. Two glass sheets made from Borofloat glass with a thickness of 1 mm are provided as starting materials of the cover layers 21, 22.

In step S8, the connection of the cover layers 21, 22 to the carrier body 10 takes place by means of anodic bonding. In the lower cover layer 21, the pressure balance openings 26 are introduced e.g. by means of spark erosion.

In Step S9, the side surfaces of the finished carrier structure 100 are prepared for fixing of a mounting. To this end, adhesive surfaces 27 are formed laterally by means of ultrasound CNC processing, to which adhesive surfaces mountings (mount receptacles) for fixing the carrier structure 100 in an optical component are fixed, e.g. adhesively bonded. Alternatively, the mountings can be fixed e.g. by means of anodic bonding, glass soldering or metal soldering.

Subsequently, in Step S11, surface finishings of the outer cover layers 21, 22, such as e.g. a thinning to a thickness of 0.1 mm and lapping and polishing for providing surfaces with optical quality.

Finally, a fine correction of the surface form of at least one of the cover layers 21, 22 and the coating with at least one reflector layer 31 optionally takes place in Step S12. The coating takes place e.g. by means of vacuum deposition of molybdenum onto the cover layer 21 in a vacuum apparatus. As a result, the mirror 200 is finished e.g. in accordance with FIG. 4.

The production of the carrier structure 100 according to the invention or of the mirror 200 according to the invention is not necessarily bound to the method steps shown in FIGS. 5 and 6. Alternatively, for forming the hollows by means of the ultrasound CNC method in Step S4, a green machining of the ceramic in the unfired or unsintered state can be provided. Furthermore, the hollows can also be formed by means of spark erosion or by means of sandblasting or water/sandblasting.

The production of the carrier structure or of the mirror is analogously possible with non-planar components, e.g. with spherically or aspherically curved components.

Curved structures can be produced in that curved ceramic bodies are used as starting material in Step S0. The fine adjustment of predetermined optical properties can take place in the case of the processing of the cover layer 21, e.g. in the Steps S11 and S12.

The features of the invention disclosed in the claims, the description and the drawings can be of significance individually or in combination for the realization of the invention.

The invention claimed is:

1. A carrier structure comprising:
   a carrier body having a thickness direction and a lateral direction and consisting of SiSiC ceramic with hollows, wherein the hollows extend in the thickness direction through the carrier body in such a manner that at least one continuous closed side wall consisting of said SiSiC ceramic and extending in the lateral direction remains, which forms at least one main surface of the carrier body and which continuously closes one side of the carrier body in the thickness direction, and
   at least one cover layer comprising glass and arranged on the at least one main surface of the carrier body,
   wherein the at least one cover layer is connected to the at least one main surface of the carrier body by at least one anodic bond connection being produced by anodic bonding and the at least one anodic bond connection comprises an ion concentration gradient across an interface between the at least one cover layer and the at least one main surface of the carrier body connected to one another.

2. The carrier structure according to claim 1, wherein the carrier body comprises a composite of a plurality of carrier body parts.

3. The carrier structure according to claim 2, wherein the carrier body parts form a closed hollow structure.

4. The carrier structure according to claim 1, wherein the at least one cover layer comprises two glass layers which are arranged on mutually opposite main surfaces of the carrier body.

5. The carrier structure according to claim 1, wherein at least one reflector layer is provided on at least one surface of the at least one cover layer.

6. The carrier structure according to claim 1, wherein the carrier body and the at least one cover layer form a layer construction with thermal dimensional stability.

7. The carrier structure according to claim 1, wherein at least one of the carrier body and the at least one cover layer have at least one pressure-balance opening.

8. The carrier structure according to claim 1, wherein the carrier structure is adapted to carry at least one of a mirror body, optical components and dynamically moved components.

9. A method for producing the carrier structure of claim 1, comprising the steps of:
   providing the carrier body; and
   connecting the at least one cover layer to the at least one main surface of the carrier body by anodic bonding.

10. The method according to claim 9, wherein the step of providing the carrier body comprises forming the hollows by a shaping of the SiSiC ceramic in a precursor state.

11. The method according to claim 9, wherein the at least one cover layer comprises two glass layers which are connected to mutually opposite main surfaces of the carrier body.

12. The method according to claim 9, wherein the step of providing the carrier body comprises forming a composite of a plurality of carrier body parts by anodic bonding.

13. The method according to claim 9, further comprising the step of forming at least one reflector layer on at least one surface of the at least one cover layer.

14. The method according to claim 9, wherein the carrier structure is adapted to carry at least one of a mirror body, optical components and dynamically moved components.

15. A carrier structure comprising:
- a carrier body having a thickness direction and a lateral direction and consisting of SiSiC ceramic with hollows, wherein the hollows extend in the thickness direction through the carrier body in such a manner that at least one continuous closed side wall consisting of said SiSiC ceramic and extending in the lateral direction remains, which forms at least one main surface of the carrier body and which continuously closes one side of the carrier body in the thickness direction;
- at least one cover layer comprising glass and arranged on the at least one main surface of the carrier body; and
- at least one reflector layer arranged on at least one surface of the at least one cover layer, wherein: (a) the at least one cover layer is connected to the at least one main surface of the carrier body by at least one anodic bond such that there is an ion concentration gradient across an interface between the at least one cover layer and the at least one main surface of the carrier body; (b) the at least one cover layer has a thickness from 10 μm to 50 μm; (c) the hollows are defined by intermediate walls between hollows and non-intermediate walls arranged at sides of the carrier body; and (d) the non-intermediate walls are thicker than the intermediate walls.

16. A method for producing the carrier structure of claim 15, comprising the steps of providing the carrier body, and connecting the at least one cover layer to the at least one main surface of the carrier body by anodic bonding.

* * * * *